(12) United States Patent
Binhussain et al.

(10) Patent No.: US 9,321,695 B2
(45) Date of Patent: Apr. 26, 2016

(54) METHOD FOR MANUFACTURING GLASS-CERAMIC COMPOSITE

(71) Applicants: King Abdul Aziz City for Science and Technology (KACST), Riyadh (SA); Università di Padova, Padua (IT)

(72) Inventors: Mohammed A Binhussain, Riyadh (SA); Paolo Colombo, Padua (IT); Enrico Bernardo, Padua (IT); Majed A Binmajed, Riyadh (SA); Mauro Marangoni, Padua (IT); Hamad H Atalasi, Riyadh (SA); Amer M Alajmi, Riyadh (SA)

(73) Assignee: King Abdulaziz City for Science and Technology (KACST), Riyadh (SA)

( * ) Notice: Subject to any disclaimer, the term of this patent is extended or adjusted under 35 U.S.C. 154(b) by 421 days.

(21) Appl. No.: 13/736,242

(22) Filed: Jan. 8, 2013

(65) Prior Publication Data

US 2014/0191448 A1  Jul. 10, 2014

(51) Int. Cl.
| | |
|---|---|
| C03C 10/06 | (2006.01) |
| C03C 10/16 | (2006.01) |
| C03B 19/06 | (2006.01) |
| C04B 41/80 | (2006.01) |
| C03C 1/00 | (2006.01) |
| C03C 14/00 | (2006.01) |

(52) U.S. Cl.
CPC ............... C04B 41/80 (2013.01); C03B 19/06 (2013.01); C03C 1/002 (2013.01); C03C 14/004 (2013.01); C03C 2214/04 (2013.01); C03C 2214/20 (2013.01); C03C 2214/30 (2013.01)

(58) Field of Classification Search
CPC ............ C03C 1/002; C03C 1/04; C03C 1/10; C03C 10/00–10/16; C03B 19/06
See application file for complete search history.

(56) References Cited

U.S. PATENT DOCUMENTS

| | | | | |
|---|---|---|---|---|
| 4,767,725 | A * | 8/1988 | Mizutani et al. | 501/3 |
| 5,028,569 | A * | 7/1991 | Cihon | 501/32 |
| 5,393,472 | A * | 2/1995 | Shaw | 264/660 |
| 6,187,255 | B1 * | 2/2001 | Greulich | 264/642 |
| 6,348,427 | B1 * | 2/2002 | Hamada et al. | 501/32 |
| 2005/0242477 | A1 * | 11/2005 | Haun | 264/601 |
| 2008/0076655 | A1 * | 3/2008 | Eamsiri et al. | 501/32 |
| 2014/0109617 | A1 * | 4/2014 | Grigorenko et al. | 65/31 |

* cited by examiner

*Primary Examiner* — Erin Snelting (74) *Attorney, Agent, or Firm* — Timberline Patent Law Group PLLC (57) ABSTRACT

The invention provides a method for manufacturing a glass-ceramic composite using natural raw material and waste glasses. The invention provides a method for manufacturing a white glass-ceramic composite using waste glass and a whitening agent. The invention also provides a method for manufacturing a colored glass-ceramic composite using waste glass, the whitening agent and a coloring agent.

13 Claims, 7 Drawing Sheets

METHOD FOR MANUFACTURING GLASS-CERAMIC COMPOSITE

FIELD OF THE INVENTION

The invention generally relates to a method for manufacturing a glass-ceramic composite. More specifically, the invention relates to a method for manufacturing a white glass-ceramic composite and a colored glass-ceramic composite using natural raw materials and waste glass.

BACKGROUND OF THE INVENTION

Glass-ceramics are widely used in various industries. The glass-ceramics are mainly used for manufacturing tiles due to properties such as, but not limited to, high strength, toughness, translucency or opacity, low or even negative thermal expansion, high temperature stability and high chemical durability.

Generally, the glass-ceramics are produced using a two steps process. In first step, a glass is produced by a glass manufacturing process using different types of raw materials. During the second step, the glass is melted and cast into a mold or shaped using any techniques known to those ordinarily skilled in the art. The molten glass is cooled down and thereafter reheated to partly crystallize the glass during the second step.

An alternative method for manufacturing glass-ceramics includes sintering and crystallizing glass particles of suitable composition. Sintering temperature needs to be adjusted well above crystallization temperature and high heating rates are required to force the glass to sinter before extensive crystallization. For such adjustment, secondary glasses such as soda-lime scraps or recycled pharmaceutical borosilicate glasses are used as sintering aids. Alternatively, nucleation agents are typically added for aiding and controlling the crystallization process. The high heating rates required to force the glass to sinter before extensive crystallization consumes high amount of energy. Further, the glass-ceramics produced using the conventional method exhibit only few desired mechanical and chemical properties as the amount of crystal phases in the glass-ceramics is low. Moreover, the amount of natural raw materials used in the conventional methods for preparing glass-ceramic is also high.

Additionally, glass wastes are immobilized by disposal in land-fills or immobilized in cement industries. Economic justification for capital and operational costs of implementing procedures for disposal of glass waste tends to be very high.

Therefore, there is a need to develop a method for manufacturing glass-ceramics, which is environment friendly, cost effective and has superior mechanical and chemical properties.

BRIEF DESCRIPTION OF THE FIGURE

The accompanying figure together with the detailed description below forms part of the specification and serves to further illustrate various embodiments and to explain various principles and advantages all in accordance with the present invention.

DETAILED DESCRIPTION OF THE INVENTION

Before describing in detail embodiments that are in accordance with the invention, it should be observed that the embodiments reside primarily in method steps related to manufacturing a white glass-ceramic composite and a colored glass-ceramic composite.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article or composition that comprises a list of elements does not include only those elements but may include other elements not expressly listed or inherent to such process, method, article or composition. An element proceeded by "comprises . . . a" does not, without more constraints, preclude the existence of additional identical elements in the process, method, article or composition that comprises the element.

Generally speaking, pursuant to various embodiments, the invention provides a method for manufacturing a glass-ceramic composite. The white glass-ceramic composite is manufactured using conventional raw material such as whitening agent and waste glasses such as cullet. The colored glass-ceramic composite is manufactured using conventional raw material such as whitening agent, waste glasses such as cullet and coloring agent.

Figure 1:
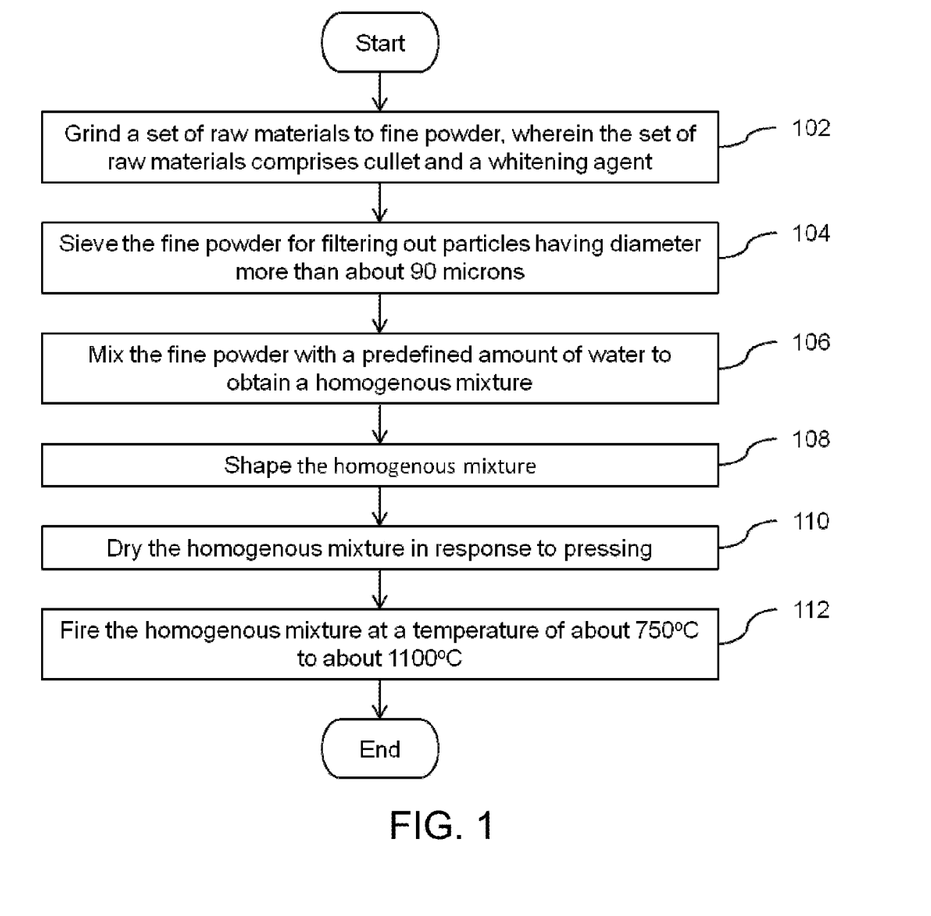
FIG. 1 illustrates a flow diagram of a method for manufacturing a white glass-ceramic composite in accordance with an embodiment of the invention.

FIG. 1 illustrates a flow diagram of a method for manufacturing a white glass-ceramic composite in accordance with an embodiment of the invention.

A specific set of raw materials are used to manufacture the white glass-ceramic composite. The set of raw materials includes waste glasses, a coloring agent and a whitening agent. The waste glasses include cullet. Cullet is beneficial as use of cullet decreases time and temperature required during the manufacturing process of the glass-ceramic composite. Preferably, soda-lime glass cullet can be used as a raw material. Further, cullet obtained from recycling of pharmaceutical glass, cathode ray tube (CRT) glass or borosilicate glass can also be used as the raw material. The cullet preferably does not contain a large amount of coloring impurities such as iron oxide or similar oxides. The composition of cullet essentially includes about 65 wt % to about 75 wt % of silicon dioxide ($SiO_2$), about 10 wt % to about 20 wt % of sodium oxide ($Na_2O$), about 5 wt % to about 15 wt % of calcium oxide (CaO), about 0 wt % to about 4 wt % magnesium oxide (MgO) and about 1.0 wt % to about 2.0 wt % other oxides.

Further, the whitening agent is selected from a group consisting of meta-kaolin, wollastonite precursor powder, calcium fluoride ($CaF_2$) and a mixture of α-quartz ($SiO_2$) and limestone ($CaCO_3$) in stoichiometric ratio of 1:1. The composition of meta-kaolin essentially includes about 50 wt % to about 55 wt % of silicon dioxide ($SiO_2$), about 40 wt % to about 45 wt % of alumina ($Al_2O_3$), and about 5 wt % to about 10 wt % of other oxides. Ceramic grade fluorite is generally used as a source of calcium fluoride. The composition of ceramic grade fluorite essentially includes about 85 wt % to about 97 wt % of calcium fluoride ($CaF_2$) and about 3 wt % to about 15 wt % of other oxides. The mixture of α-quartz ($SiO_2$) and limestone ($CaCO_3$) in stoichiometric ratio of 1:1 is used for the production of β-wollastonite.

At step 102, a set of raw materials are ground into a fine powder. Any suitable grinding machine such as, but not limited to, a roll crusher, a ball mill or an impeller breaker can be used for grinding the set of raw materials and as such those techniques would be apparent to those ordinarily skilled in the art.

In an embodiment, the set of raw materials includes about 65 wt % to about 95 wt % of cullet and about 5 wt % to about 35 wt % of the whitening agent.

In another embodiment, the set of raw materials includes about 65 wt % to about 95 wt % of cullet and about 5 wt % to about 35 wt % of the meta-kaolin.

In yet another embodiment, the set of raw materials includes about 65 wt % to about 95 wt % of cullet and about 5 wt % to about 35 wt % of the wollastonite precursor powder.

In yet another embodiment, the set of raw materials includes about 65 wt % to about 95 wt % of cullet and about 5 wt % to about 35 wt % of the calcium fluoride.

In yet another embodiment, the set of raw materials includes about 65 wt % to about 95 wt % of cullet and about 5 wt % to about 35 wt % of the mixture of α-quartz ($SiO_2$) and limestone ($CaCO_3$) in stoichiometric ratio of 1:1.

At step 104, the fine powder is sieved to filter out particles of diameter more than about 90 microns (μ). The processing characteristics are optimized due to the use of particles of sizes less than 90μ.

Thereafter, at step 106, the fine powder with particles of sizes less than 90μ is mixed with a predefined amount of water to obtain a homogenous mixture. Any suitable mixing device can be used for mixing the fine powder with particles of sizes less than 90μ and the predefined amount of water. For example, mixing devices such as, but not limited to, magnetic stirring plates, vibrating plates, a ball mill and motor-driven stirring blades can be used for mixing the fine powder with the particles of sizes less than 90μ with the predefined amount of water.

Moving on, at step 108, the homogenous mixture is shaped. In an embodiment, the homogenous mixture is shaped using one of uniaxial cold pressing, biaxial cold pressing, dry pressing, semi-dry pressing, compacting, cold isostatic pressing, hot pressing, extrusion molding, injection molding, compression molding, gel casting, slip casting and tape casting. Any other suitable type of technique for shaping can be used at step 108 and as such the techniques which can be used would be apparent to those ordinarily skilled in the art. For example, the homogenous mixture is uniaxially cold pressed at a pressure of about 10 Megapascal (MPa) to about 60 MPa in a mold.

Thereafter, at step 110, the homogenous mixture is allowed to dry. In accordance with the embodiment, the homogenous mixture is dried at a temperature of about 80° C. for period of about 8 hours to about 10 hours. For example, the homogenous mixture can be dried at a temperature of about 80° C. in a refractory slab overnight.

Figure 2:
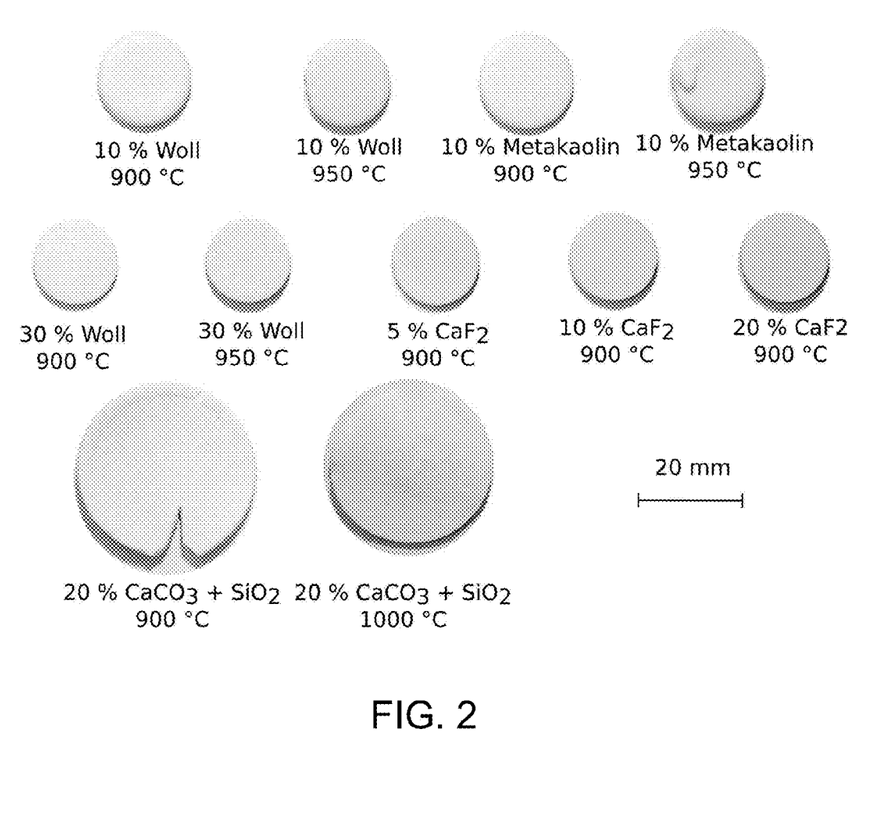
FIG. 2 illustrates samples of white glass-ceramic composite prepared using 70 weight percent (wt %) to 90 wt % of cullet and a whitening agent.

Finally, at step 112, the homogenous mixture is fired at a temperature about 750° C. to about 1100° C. In accordance with the embodiment, the homogenous mixture is fired at a temperature of about 750° C. to about 1100° C. with a rate of about 5° C. per minute to about 50° C. per minute for a period of about 15 minutes to about 1 hour. FIG. 2 illustrates samples of white glass-ceramic composite prepared using 70 wt % to 90 wt % of cullet and a whitening agent.

Figure 3:
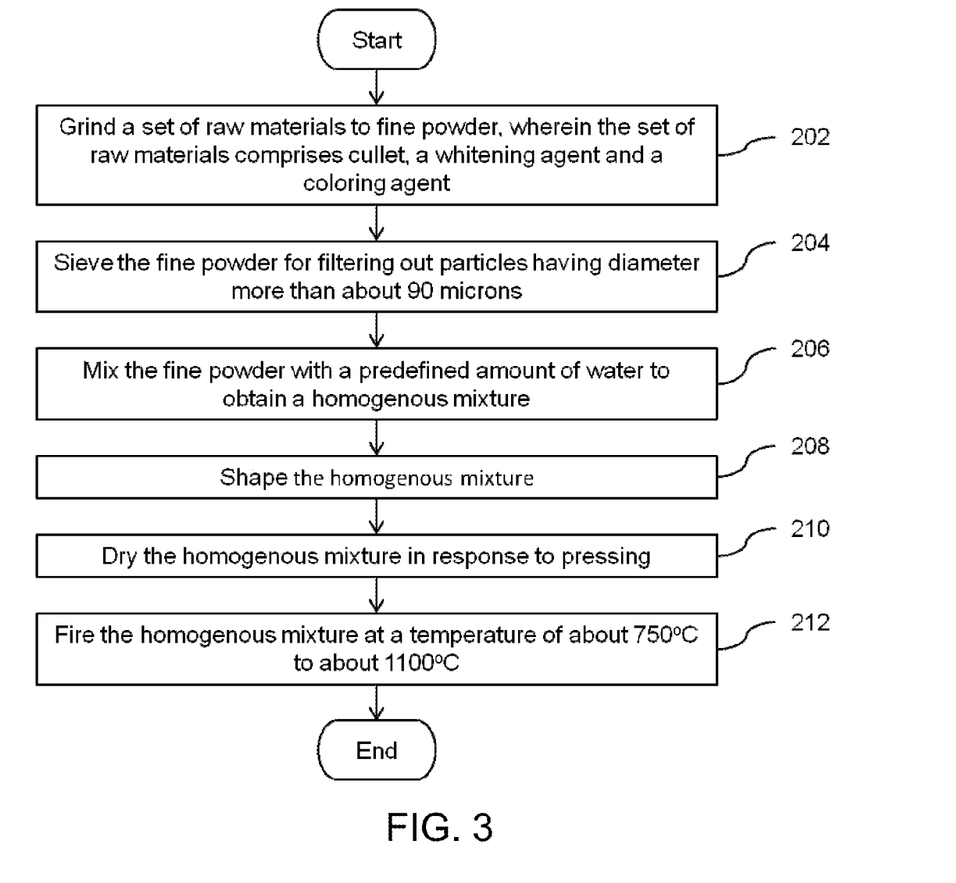
FIG. 3 illustrates a flow diagram of a method for manufacturing a colored glass-ceramic composite in accordance with an embodiment of the invention.

FIG. 3 illustrates a flow diagram of a method for manufacturing a colored glass-ceramic composite in accordance with an embodiment of the invention.

A specific set of raw materials are used to manufacture the colored glass-ceramic composite. The set of raw materials includes waste glasses, a coloring agent and a whitening agent. The waste glasses include cullet. Preferably, soda-lime glass cullet can be used as a raw material. Further, cullet obtained from recycling of pharmaceutical glass, cathode ray tube (CRT) glass or borosilicate glass can also be used as the raw material. The cullet preferably does not include large amount of coloring impurities such as iron oxide or similar oxides. The composition of cullet essentially includes about 60 wt % to about 75 wt % of silicon dioxide ($SiO_2$), about 10 wt % to about 20 wt % of sodium oxide ($Na_2O$); about 10 wt % to about 15 wt % of calcium oxide (CaO), about 2 wt % to about 4 wt % magnesium oxide (MgO), and about 1.0 wt % to about 2.0 wt % other oxides.

The coloring agent includes metal oxide based coloring agent such as, but not limited to, metal oxides of blue, yellow, orange and red colors. The metal oxide pigments used as coloring agents includes, but not limited to, vanadium yellow cassiterite $[(Sn,V)O_2]$, vanadium zirconium yellow $[(Zr,V)O_2]$, cobalt aluminate $[CoAl_2O_4]$, Cobalt zinc aluminate blue spinel $[(Co,Zn)Al_2O_4]$, $(Cr,Fe,Zn)Al_2O_4$ and cadmium orange pigment [PO20].

Further, the whitening agent is selected from a group consisting of meta-kaolin, wollastonite precursor powder, calcium fluoride ($CaF_2$) and a mixture of α-quartz ($SiO_2$) and limestone ($CaCO_3$) in stoichiometric ratio of 1:1. The composition of meta-kaolin essentially includes about 50 wt % to about 55 wt % of silicon dioxide ($SiO_2$), about 40 wt % to about 45 wt % of alumina ($Al_2O_3$), and about 5 wt % to about 10 wt % of other oxides. Ceramic grade fluorite is generally used as a source of calcium fluoride. The composition of ceramic grade fluorite essentially includes about 85 wt % to about 97 wt % of calcium fluoride ($CaF_2$), and about 3 wt % to about 15 wt % of other oxides. The mixture of α-quartz ($SiO_2$) and limestone ($CaCO_3$) in stoichiometric ratio of 1:1 is used for the production of β-wollastonite.

At step 202, a set of raw materials are ground into a fine powder. Any suitable grinding machine such as, but not limited to, a roll crusher, a ball mill or an impeller breaker can be used for grinding the set of raw materials and as such those techniques would be apparent to those ordinarily skilled in the art.

In an embodiment, the set of raw materials includes about 65 wt % to about 95 wt % of cullet, about 2 wt % to about 7 wt % of metal silicate based coloring agent and about 5 wt % to about 33 wt % of the whitening agent.

In another embodiment, the set of raw materials includes about 65 wt % to about 95 wt % of cullet, about 2 wt % to about 7 wt % of metal silicate based coloring agent and about 5 wt % to about 35 wt % of the meta-kaolin.

In yet another embodiment, the set of raw materials includes about 65 wt % to about 95 wt % of cullet, about 2 wt % to about 7 wt % of metal silicate based coloring agent and about 5 wt % to about 35 wt % of the wollastonite precursor powder.

In yet another embodiment, the set of raw materials includes about 65 wt % to about 95 wt % of cullet, about 2 wt % to about 7 wt % of metal silicate based coloring agent and about 5 wt % to about 35 wt % of the calcium fluoride.

In yet another embodiment, the set of raw materials includes about 65 wt % to about 95 wt % of cullet, about 2 wt % to about 7 wt % of metal silicate based coloring agent and about 5 wt % to about 35 wt % of the mixture of α-quartz ($SiO_2$) and limestone ($CaCO_3$) in stoichiometric ratio of 1:1.

At step 204, the fine powder is sieved to filter out particles of diameter more than about 90 microns (μ). The processing characteristics are optimized due to the use of particles of sizes of less than 90μ.

Thereafter, at step 206, the fine powder with particles of sizes less than 90μ is mixed with a predefined amount of water to obtain a homogenous mixture. Any suitable mixing device can be used for mixing the fine powder with particles of sizes less than 90μ and the predefined amount of water. For example, mixing devices such as, but not limited to, magnetic stirring plates, vibrating plates, a ball mill and motor-driven stirring blades can be used for mixing the fine powder with the particles of sizes less than 90μ with the predefined amount of water.

Moving on, at step 208, the homogenous mixture is shaped. In an embodiment, the homogenous mixture is shaped using one of uniaxial cold pressing, biaxial cold pressing, dry pressing, semi-dry pressing, compacting, cold isostatic pressing, hot pressing, extrusion molding, injection molding, compression molding, gel casting, slip casting and tape casting. Any other suitable type of technique for shaping can be used at step 208 and as such the techniques which can be used would be apparent to those ordinarily skilled in the art. For example, the homogenous mixture is uniaxially cold pressed at a pressure of about 10 Megapascal (MPa) to about 60 MPa in a mold.

Thereafter, at step 210, the homogenous mixture is allowed to dry. In accordance with the embodiment, the homogenous mixture is dried at a temperature of about 80° C. for period of about 8 hours to about 10 hours. For example, the homogenous mixture can be dried at a temperature of about 80° C. in an oven for period of about 8 hours to about 10 hours.

Figure 4:
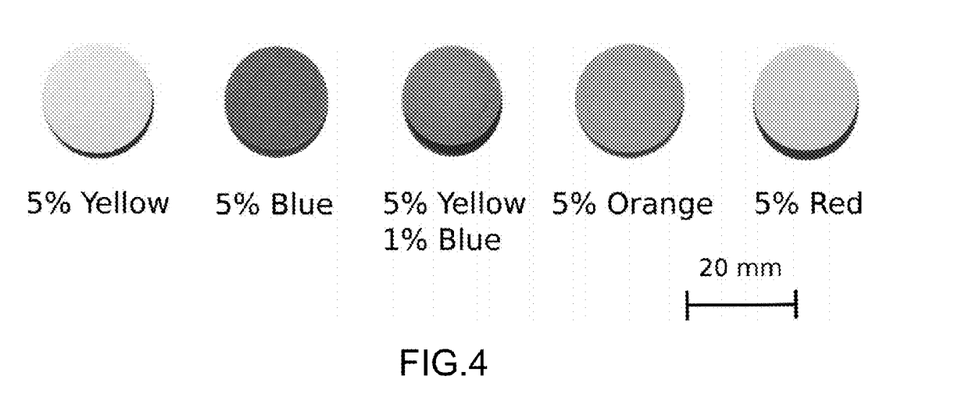
FIG. 4 illustrates colored glass-ceramics composed of 80 wt % of cullet and 20 wt % of calcium fluoride ($CaF_2$) mixed with a coloring agent.

Finally, at step 212, the homogenous mixture is fired at a temperature about 750° C. to about 1100° C. In accordance with the embodiment, the second fine powder is fired at a temperature of about 750° C. to about 1100° C. with a rate of about 5° C. per minute to about 50° C. per minute for a period of about 15 minutes to about 1 hour. FIG. 4 illustrates samples of colored glass-ceramic composite prepared using 80 wt % of cullet and 20 wt % of calcium fluoride ($CaF_2$) mixed with a coloring agent.

Working Examples

TABLE 1

Formulation for preparing white glass ceramic composites

| Sample | Cullet (in grams) | Meta-kaolin (in grams) |
|---|---|---|
| 1 | 90 | 10 |
| 2 | 87 | 13 |
| 3 | 80 | 20 |

TABLE 2

Formulation for preparing white glass ceramic composites

| Sample | Cullet (in grams) | Wollastonite precursor powder (in grams) |
|---|---|---|
| 1 | 95 | 5 |
| 2 | 70 | 30 |
| 3 | 68 | 32 |

TABLE 3

Formulation for preparing white glass ceramic composites

| Sample | Cullet (in grams) | Calcium fluoride (in grams) |
|---|---|---|
| 1 | 95 | 5 |
| 2 | 90 | 10 |
| 3 | 80 | 20 |
| 4 | 65 | 35 |
| 5 | 79 | 21 |

TABLE 4

Formulation for preparing white glass ceramic composites

| Sample | Cullet (in grams) | Mixture of α-quartz and limestone in stoichiometric ratio of 1:1 (in grams) |
|---|---|---|
| 1 | 80 | 20 |
| 2 | 90 | 10 |

TABLE 5

Formulation for preparing colored glass ceramic composites

| Sample | Cullet (in grams) | Calcium fluoride (in grams) | Coloring agent (in grams) |
|---|---|---|---|
| 1 | 63 | 30 | 7 |
| 2 | 76 | 20 | 4 |

TABLE 6

Formulation for preparing colored glass ceramic composites

| Sample | Cullet (in grams) | Mixture of α-quartz and limestone in stoichiometric ratio of 1:1 (in grams) | Coloring agent (in grams) |
|---|---|---|---|
| 1 | 78 | 20 | 2 |
| 2 | 88 | 10 | 2 |

TABLE 7

Formulation for preparing colored glass ceramic composites

| Sample | Cullet (in grams) | Wollastonite precursor powder (in grams) | Coloring agent (in grams) |
|---|---|---|---|
| 1 | 93 | 5 | 2 |
| 2 | 63 | 30 | 7 |

TABLE 8

Formulation for preparing colored glass ceramic composites

| Sample | Cullet (in grams) | Meta-kaolin (in grams) | Coloring agent (in grams) |
|---|---|---|---|
| 1 | 85 | 12 | 3 |
| 2 | 77 | 18 | 5 |

The formulation of a set of raw materials selected from table 1-8 is ground into fine powder in a ball mill. The fine powder is sieved to filter our particles of diameter more than 90 microns. The fine powder is then mixed with a predefined amount of water to obtain a homogenous mixture. The homogenous mixture is uniaxially cold pressed in a mold at a pressure of 10 MPa to 60 MPa. Thereafter, the homogenous mixture is dried at a temperature of 80° C. in a refractory slab overnight. After drying, the homogenous mixture is fired at a temperature of about 750° C. to about 1100° C. with a rate of about 5° C. per minute to about 50° C. per minute for a period of about 15 minutes to about 1 hour. Depending on the formulation of raw material selected, either white or colored glass-ceramic composite is formed in the mold.

The white and colored glass-ceramic composites obtained using the various embodiments of the invention produces a high amount of four different crystal phases in the final formulation. One crystal phase is derived from a reaction between meta-kaolin and a glass matrix, which leads to formation of anorthite. The reaction is as follows:

$$Al_2O_3 \cdot 2SiO_2 \text{ (meta-kaolin)} + CaO \text{ (glass matrix)} \rightarrow CaO \cdot Al_2O_3 \cdot 2SiO_2 \text{ (anorthite)}$$

Figure 5:
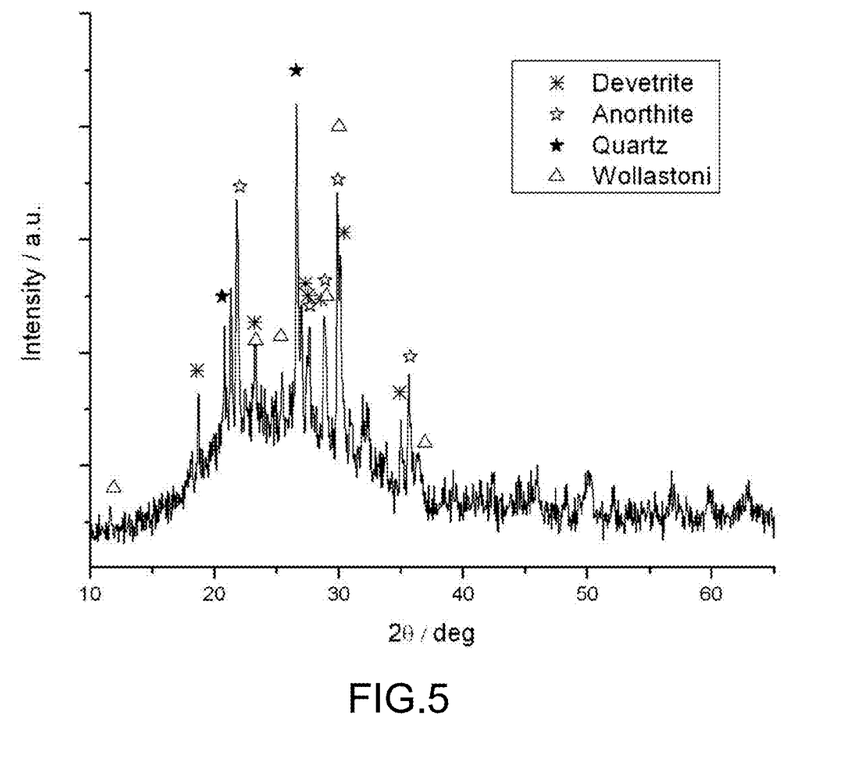
FIG. 5 illustrates X-ray diffraction pattern of a white glass-ceramic composite prepared using 90% of cullet and 10% of meta-kaolin fired at a temperature of 900° C. for a period of 30 minutes.

Other crystal phases are calcium silicates such as wollastonite ($CaSiO_3$) and sodium-calcium silicate (Na—Ca silicate) such as devetrite. Couple of other peaks is very close to α-quartz pattern which are probably associated with solid solution of a quartzoid derivative with alkali or alumina substitutions in a crystal lattice. FIG. 5 illustrates X-ray diffraction pattern of a white glass-ceramic composite prepared using 90% of cullet and 10% of meta-kaolin fired at a temperature of 900° C. for a period of 30 minutes.

Further, the glass-ceramic composite is not obtained by conventional method of sintering of glass powder, but is obtained directly from reaction of different raw materials during the step of firing in the invention.

Figure 6:
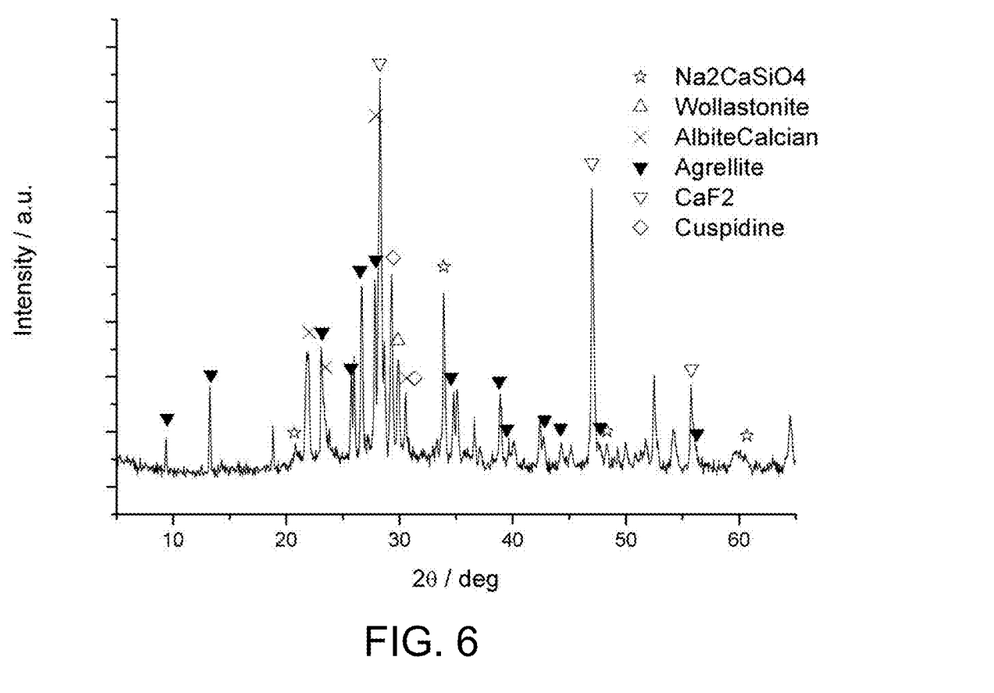
FIG. 6 illustrates X-ray diffraction pattern of a white glass-ceramic composed of 80 wt % of cullet and 20 wt % of calcium fluoride ($CaF_2$) fired at a temperature of 900° C. for a period of 30 minutes.

FIG. 6 illustrates X-ray diffraction pattern of a white glass-ceramic composed of 80 wt % of cullet and 20 wt % of calcium fluoride ($CaF_2$) fired at a temperature of 900° C. for a period of 30 minutes. The X-ray diffraction patterns for a sample containing $CaF_2$ gives a completely different result with formation of a highly crystalline ceramic. The presence of a fluorine-containing species influence formation of crystals phases such as Fluorite ($CaF_2$), Agrellite ($NaCa_2Si_4O_{10}F$), Cuspidine ($Ca_4Si_2O_7F_2$), a solid solution of Na—Ca silicates in the form of albite-calcian ($NaCaAlSi_3O_8$ and $Na_2CaSiO_4$), and β-wollastonite ($CaSiO_3$).

Further, the presence of a large amount of fluorite in the X-ray diffraction pattern is due to two mechanisms. First mechanism is a droplet phase separation at high temperatures, which is well known in an opaque silicate glass production. Meta-stable immiscibility is observed in many glass systems and is a technique for achieving a controlled precipitation of nuclei which starts a crystal growth in a glass-ceramic composite. Second mechanism is a saturation of reactions that take place between cullet and calcium fluoride ($CaF_2$). The most remarkable crystal phase formed is agrellite, which develop a white translucent color and hardness of 5.5 units. Agrellite has a structure similar to fluorcanasite ($Na_4K_2Ca_5Si_{12}O_{30}F_4$).

Figure 7:
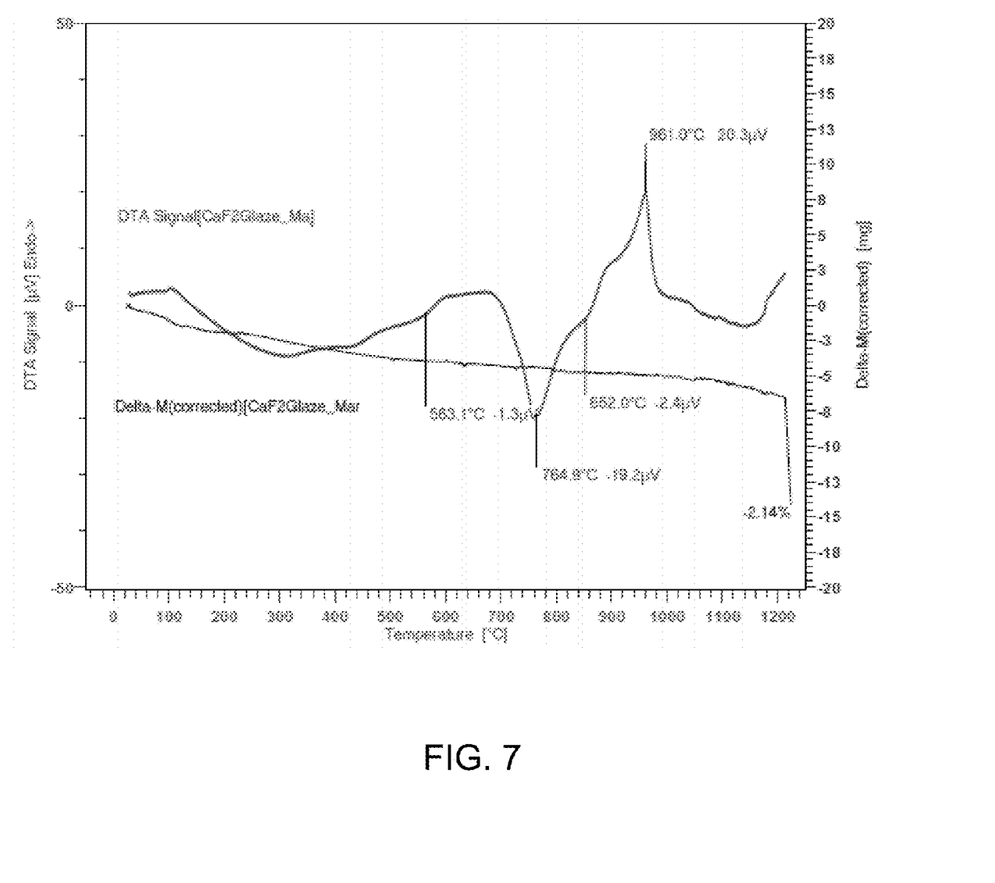
FIG. 7 illustrates Differential Thermal Analysis (DTA) curves at 10° C. per minute of a mixture composed of 80% wt of cullet and 20% wt of calcium fluoride ($CaF_2$).

FIG. 7 illustrates Differential Thermal Analysis (DTA) curves at 10° C. per minute of a mixture composed of 80% wt of cullet and 20% wt of calcium fluoride ($CaF_2$). The DTA analysis shows an exothermic peak of sintering and crystallization at 750° C. and 850° C. respectively. Both processes of sintering and crystallization are exothermic due to the fact that sintering involves surface energy reduction and crystallization of an amorphous phase releases heat. The crystallization band ends at approximately at a temperature of 900° C., whilst at 960° C. a strong endothermic peak is shown in FIG. 7. This endothermic effect may be associated with a crystal phase transformation or evolution of fluorine gas. Samples based on CaO—$CaF_2$—$SiO_2$ can be involved in an undesired production of inorganic fluorine gases. The reaction of production of fluorine gas is as follows:

$$2\,CaF_2\,(l) + SiO_2\,(l) \leftrightarrow 2\,CaO\,(l) + SiF_4\,(g)$$

Various embodiments of the invention produce glass-ceramic composites with significantly improved properties. The characterization of a glass-ceramic composite of the invention has Young's modulus in a range of about 45 Gigapascals (GPa) to about 95 GPa, bending strength of about 70 MPa to about 150 MPa and density of about 1.90 grams per cubic centimeter (g/cm3) to about 2.50 g/cm3. As glass-ceramic composites are commonly used in manufacturing tiles for building industry, water absorption is one of the issues after firing step in a process of manufacturing glass-ceramic tiles. Using the method of the invention, the water absorption range is between 1.0% and 0%.

Various embodiments of the invention provide an environment friendly glass-ceramic composite as various waste glasses are used to manufacture the glass-ceramic composite.

Those skilled in the art will realize that the above recognized advantages and other advantages described herein are merely exemplary and are not meant to be a complete rendering of all of the advantages of the various embodiments of the present invention.

In the foregoing specification, specific embodiments of the present invention have been described. However, one of ordinary skill in the art appreciates that various modifications and changes can be made without departing from the scope of the present invention as set forth in the claims below. Accordingly, the specification is to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The present invention is defined solely by the appended claims including any amendments made during the pendency of this application and all equivalents of those claims as issued.

What is claimed is:

1. A method for manufacturing a glass-ceramic composite, the method comprising:
grinding a set of raw materials to a fine powder, wherein the set of raw materials comprises a cullet and a whitening agent composed of meta-kaolin comprising about 50-55 wt % silicon dioxide, about 40-45 wt % alumina, and about 5-10 wt % other oxides;
the cullet comprising about 60 wt % to about 75 wt % of silicon dioxide, about 10 wt % to about 20 wt % of sodium oxide, about 10 wt % to about 15 wt % of calcium oxide, about 2 wt % to about 4 wt % magnesium oxide, and about 1.0 wt % to about 2.0 wt % other oxides;

sieving the fine powder for filtering out particles having diameter more than about 90 microns;

mixing the fine powder with water to obtain a homogenous mixture;

shaping the homogenous mixture;

drying the homogenous mixture in response to the shaping at a temperature of about 80° C. for about 8-10 hours;

firing the homogenous mixture at a temperature of about 750° C. to about 1100° C. to activate at least one chemical reaction during the firing, the chemical reaction $Al_2O_3.2SiO_2+CaO \rightarrow CaO.Al_2O_3.2SiO_2$ creating a crystal phase between the meta-kaolin and a glass matrix to form an anorthite; and wherein the glass-ceramic composite has Young's modulus in a range of about 45-95 Gigapascals (GPa), a bending strength of about 70-150 MPa, a density of about 1.90-2.50 grams per cubic centimeter (g/cm$^3$), and a water absorption equal to or below 1.0%.

2. The method of claim 1, wherein the set of raw materials comprises about 65 wt % to about 95 wt % of cullet and about 5 wt % to about 35 wt % of the whitening agent.

3. The method of claim 1, wherein the set of raw material further comprises a coloring agent.

4. The method of claim 3, wherein the coloring agent is metal silicate based coloring agent.

5. The method of claim 3, wherein the set of raw materials comprises about 65 wt % to about 95 wt % of cullet, about 5 wt % to about 33 wt % of the whitening agent and 2 wt % to 7 wt % of the coloring agent.

6. The method of claim 1, wherein the homogenous mixture is shaped using one of uniaxially cold pressing, biaxial cold pressing, dry pressing, semi-dry pressing, compacting, cold isostatic pressing, hot pressing, extrusion molding, injection molding, compression molding, gel casting, slip casting and tape casting.

7. The method of claim 1, wherein the homogenous mixture is fired at a temperature of about 750° C. to about 1100° C. with a heating rate of about 5° C. per minute to about 50° C. per minute for a period of about 15 minutes to about 1 hour.

8. A method for manufacturing a glass-ceramic composite, the method comprising:

grinding a set of raw materials to a fine powder, wherein the set of raw materials comprises a cullet and a whitening agent composed of calcium fluoride;

the cullet comprising about 60 wt % to about 75 wt % of silicon dioxide, about 10 wt % to about 20 wt % of sodium oxide, about 10 wt % to about 15 wt % of calcium oxide, about 2 wt % to about 4 wt % magnesium oxide, and about 1.0 wt % to about 2.0 wt % other oxides;

sieving the fine powder for filtering out particles having diameter more than about 90 microns;

mixing the fine powder with water to obtain a homogenous mixture;

shaping the homogenous mixture;

drying the homogenous mixture in response to the shaping at a temperature of about 80° C. for about 8-10 hours;

firing the homogenous mixture sufficiently at a temperature of about 900° C. for about 30 minutes to activate at least one chemical reaction during the firing, the at least one chemical reaction forming fluorine-containing crystalline phases including $NaCa_2Si_4O_{10}F$ and $Ca_4Si_2O_7F_2$, and a solid solution of the silicates $NaCaAlSi_3O_8$, $Na_2CaSiO_4$, and $CaSiO_3$; and wherein the glass-ceramic composite has Young's modulus in a range of about 45-95 Gigapascals (GPa), a bending strength of about 70-150 MPa, a density of about 1.90-2.50 grams per cubic centimeter (g/cm$^3$), and a water absorption equal to or below 1.0%.

9. The method of claim 8, wherein the set of raw materials comprises about 65 wt % to about 95 wt % of cullet and about 5 wt % to about 35 wt % of the whitening agent.

10. The method of claim 8, wherein the set of raw material further comprises a coloring agent.

11. The method of claim 10, wherein the coloring agent is metal silicate based coloring agent.

12. The method of claim 10, wherein the set of raw materials comprises about 65 wt % to about 95 wt % of cullet, about 5 wt % to about 33 wt % of the whitening agent and 2 wt % to 7 wt % of the coloring agent.

13. The method of claim 8, wherein the homogenous mixture is shaped using one of uniaxially cold pressing, biaxial cold pressing, dry pressing, semi-dry pressing, compacting, cold isostatic pressing, hot pressing, extrusion molding, injection molding, compression molding, gel casting, slip casting and tape casting.

\* \* \* \* \*